Aug. 7, 1956  S. E. GATTUSO  2,757,790
RECEPTACLES
Filed April 6, 1953  2 Sheets-Sheet 1
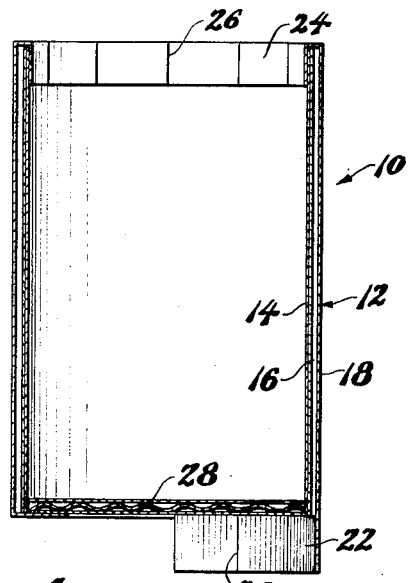
Fig. ~1~
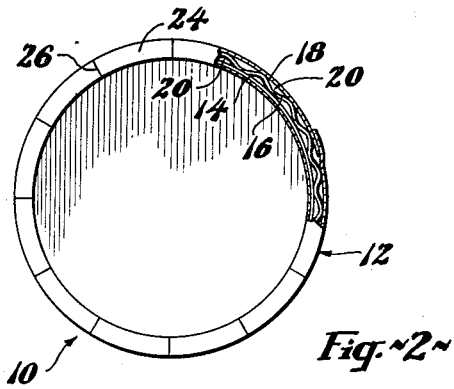
Fig. ~2~
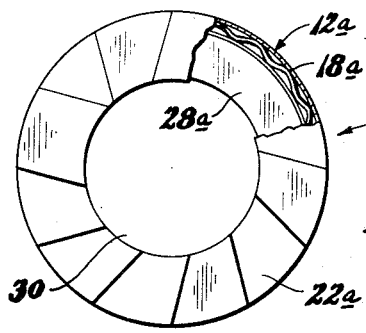
Fig. ~4~
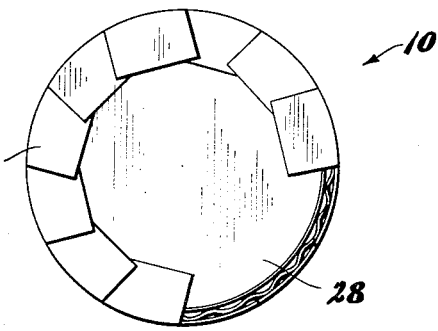
Fig. ~3~
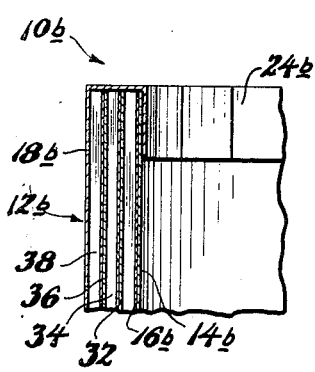
Fig. ~6~
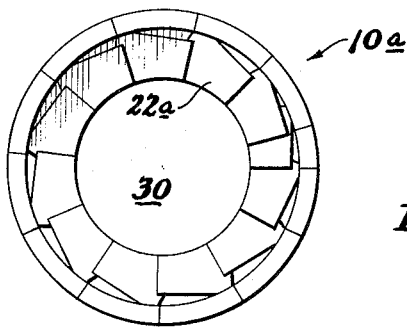
Fig. ~5~
INVENTOR.
SALVATORE E. GATTUSO
BY
ATTORNEY.

Aug. 7, 1956  S. E. GATTUSO  2,757,790
RECEPTACLES
Filed April 6, 1953  2 Sheets-Sheet 2
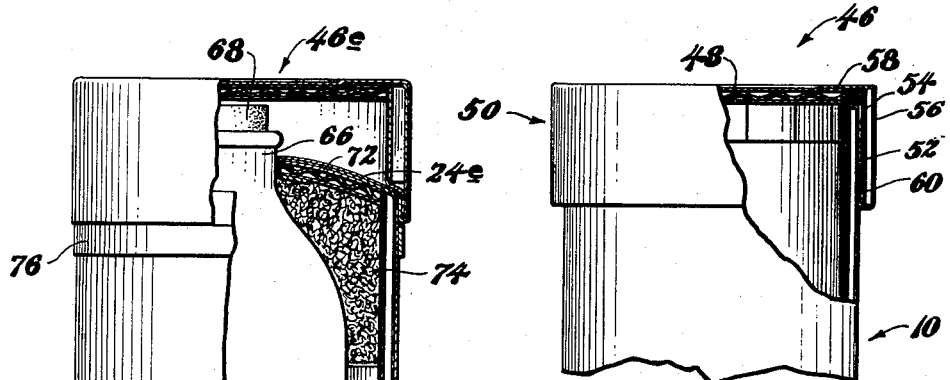
Fig. ~8~
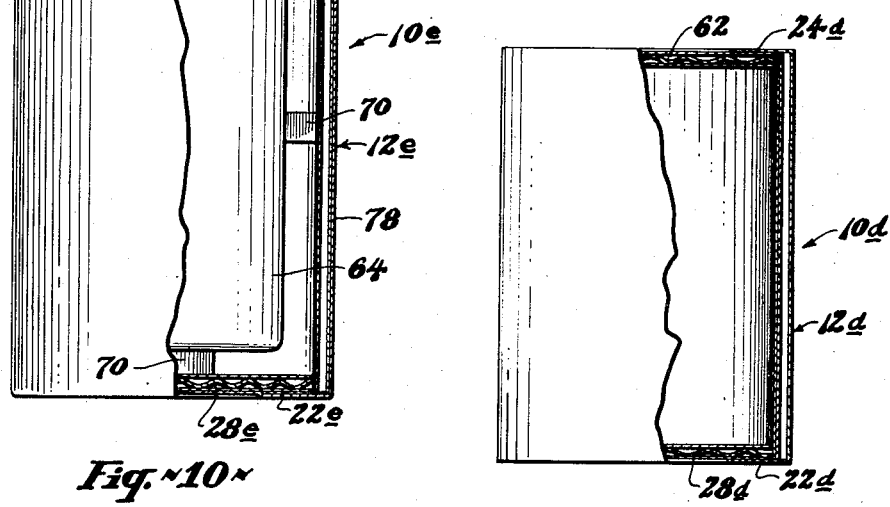
Fig. ~10~
Fig. ~9~
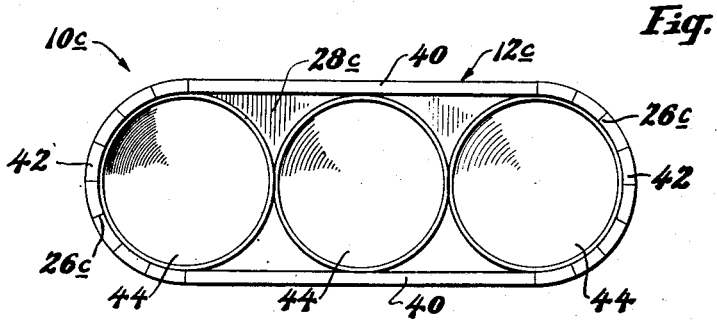
Fig. ~7~
INVENTOR.
SALVATORE E. GATTUSO
BY
ATTORNEY.

United States Patent Office 2,757,790
Patented Aug. 7, 1956

2,757,790
RECEPTACLES

Salvatore E. Gattuso, Ozone Park, N. Y., assignor of eight per cent to Anthony Capizzi, Brooklyn, eight per cent to Andrew J. Pantano, Franklin Square, eight per cent to Peter Capizzi, Brooklyn, and twenty-five per cent to Joseph Radosti, Corona, N. Y.

Application April 6, 1953, Serial No. 347,037

3 Claims. (Cl. 206—46)

The present invention relates generally to receptacles, and is particularly directed to receptacles having the side walls thereof formed of corrugated paper or cardboard.

An object of the present invention is to provide receptacles having at least the sidewalls thereof formed of corrugated paper or cardboard and wherein the internal channels or passages in the corrugated walls are sealed-off at their opposite ends to trap the air therein so that the trapped air acts to cushion and insulate the contents of the receptacle.

Another object is to provide receptacles of the described character wherein the corrugated side walls include an inner smooth layer of paper, an undulating layer of paper adhesively secured to the outer surface of the inner layer and an outer smooth layer of paper adhesively secured to the outer peaks or crests of the undulating layer so that internal channels or passages are defined between the undulating layer and the smooth inner and outer layers, and wherein the smooth outer layer extends beyond the other layers in the direction along the internal passages and is folded inwardly and adhesively secured over the opposite ends of the passages to seal-off the latter.

Another object is to provide a receptacle having the foregoing characteristics and wherein the portions of the smooth outer layer extending beyond the other layers of the side walls are also employed for adhesively securing an end wall in at least one end of the receptacle.

A further object of the present invention is to provide a receptacle having the foregoing characteristics and which is adapted to act as a cushioning shell for fragile articles, for example, liquor bottles and the like, to prevent damage to the contents during shipment or under other circumstances likely to result in rough handling.

A still further object is to provide a receptacle having the foregoing characteristics and which is adapted to act as a heat insulating container for heated, chilled or frozen contents.

A still further object is to provide a receptacle having the foregoing characteristics and which receives a glass bottle in a manner providing an insulated vessel for maintaining a liquid in either a heated or chilled condition in a fashion similar to a vacuum bottle.

In accordance with the present invention, the foregoing, and other objects, features and advantages, are realized by providing a receptacle having a tubular side wall formed of corrugated paper or cardboard and including an inner smooth layer, an undulating layer adhesively secured to the outer surface of the inner layer and an outer smooth layer adhesively secured to the outer peaks or crests of the undulating layer so that internal channels or passages are defined between the undulating layer and the smooth layers extending parallel to the axis of the tubular side wall. The outer smooth layer extends beyond the other layers in the direction of the internal passages, and the projecting portions of the outer layer are folded inwardly over the adjacent ends of the internal passages to seal-off the latter. An end wall is provided at least at one end of the tubular side wall and is formed of a disc or ring of corrugated paper or cardboard, with the inwardly folded portions of the smooth outer layer being adhesively secured to the end wall to hold the latter in position. The receptacle may be sealed by a removable flanged cover telescoping over the open end of the receptacle or by a disc positioned in the open end of the receptacle after the contents have been placed in the latter and secured by the inwardly folded portions of the outer wall at the related end of the receptacle which are adhesively attached to the cover disc. In providing an insulated bottle for hot or cold liquids, a glass bottle is placed in a receptacle of the described character and a corrugated ring is secured in the upper end of the receptacle with the neck of the bottle extending through the central aperture of the corrugated ring so that the bottle is held firmly within the receptacle, with a flanged cover being formed to enclose the top of the receptacle and the projecting neck of the bottle.

In order that the present invention may be clearly understood, several illustrative embodiments thereof will be hereinafter described in detail and are shown in the accompanying drawings, forming a part hereof, and wherein:

Fig. 1 is an axial sectional view of a receptacle constructed in accordance with an embodiment of the present invention;

Fig. 2 is a top plan view, partly broken away and in section, of the receptacle in Fig. 1;

Fig. 3 is a bottom plan view of the receptacle in Fig. 1;

Fig. 4 is a bottom plan view of a receptacle constructed in accordance with another embodiment of the present invention, and shown partly broken away and in section;

Fig. 5 is a top plan view of the receptacle in Fig. 4;

Fig. 6 is a fragmentary axial sectional view of a receptacle constructed according to another embodiment of the invention;

Fig. 7 is a top plan view of a receptacle constructed in accordance with still another embodiment of the present invention;

Fig. 8 is a side elevational view, partly broken away and in section, showing one form of closure for association with receptacles embodying the present invention;

Fig. 9 is a side elevational view, partly broken away and in section, showing another form of closure for association with receptacles embodying the present invention; and Fig. 10 is a side elevational view, partly broken away and in section, of still another constructional embodiment of the present invention.

Referring to the drawings in detail, and initially to Figs. 1, 2 and 3 thereof, a receptacle embodying the present invention is there shown and generally identified by the reference numeral 10. The receptacle 10 includes a tubular side wall 12 which is formed of corrugated paper or cardboard made up of an inner smooth layer 14, an undulating layer 16 adhesively secured to the outer surface of the inner layer 14 and an outer smooth layer 18 adhesively secured to the outer peaks or crests of the undulating layer 16. Internal passages or channels 20 are formed in the wall 12 between the undulating layer 16 and the smooth layers 14 and 18 and the passages 20 extend longitudinally or parallel to the axis of the tubular side wall.

If the outer smooth layer 18 is secured fixedly to the undulating layer 16 prior to the bending of the corrugated material, such bending or curving of the corrugated material will result in buckling of the inner layer 14 and will weaken the structure of the side wall. In order to prevent such buckling, the inner layer 14 and the undulating layer 16 may be first adhesively fixed to each other and bent or curved as desired, and then the outer layer 18 can be wrapped around and adhesively secured to the undulating layer. Alternatively, the buckling of the inner layer 14 can be prevented by bending or curving the corrugated material to form the tubular side wall 12 while the adhesive between the outer layer 18 and the undulating layer 16 is still wet and has not yet set so that the layer 18 can slip relative to the undulating layer 16 to accommodate the differences in the circumferences of the inner layer 14 and the outer layer 18 in the tubular side wall.

In accordance with the present invention, the opposite ends of the internal passages 20 in the tubular side wall 12 are sealed-off or shut to trap the air therein so that the air trapped in these passages serves as a pneumatic cushion or heat insulation for the contents of the receptacle. Preferably, the outer smooth layer 18 is formed to extend beyond the other layers 14 and 16 in the axial direction, that is, the direction parallel to the passages 20, and the end portions 22 and 24 of the outer layer 18 extending beyond the other layers are folded inwardly over the lower and upper ends of the passages 20 to seal-off the latter. When the tubular side wall 12 is curved, the end portions 22 and 24 are longitudinally slit, as shown at 26, so that the slit end portions can be folded radially inward without wrinkling.

If an end of the receptacle is to be left open, for example, as is the upper end of the receptacle 10 in Figs. 1, 2 and 3, the slit end portions 24 of the outer layer 18, after being folded radially inward to close the upper ends of the passages 20, are then folded down and adhesively secured to the interior surface of the inner layer 14 thereby increasing the rigidity of the tubular side wall.

An end wall 28 may be secured in one or both ends of the tubular side wall 12 and is preferably formed by a suitably shaped plate of corrugated material. The end wall 28 is held in place by the slit portions 22 of the outer layer 18 at the adjacent end of the tubular side wall, and these slit portions 22, after being folded inwardly, are adhesively secured to the outer or lower surface of the end wall 28 to provide a tight seal and joint between the end wall and the tubular side wall.

The receptacle described above can serve as a cushioning shell for a fragile article, for example, a bottle, jar or other fragile container, to shield the fragile article from severe shocks and impacts during shipment or under other circumstances in which it is likely to be exposed to rough or careless handling. The corrugated material forming the side and end walls has relatively great rigidity and resilience and the air trapped in the sealed passages 20 further serves to cushion the article. It is also to be noted that the receptacle 10 described above, when provided with a moisture impervious coating, for example, of paraffin and the like, and with a suitable closure for the open end, as hereinafter described in detail, can be used as a container for heated, chilled or frozen comestibles, and the sealed passages 20 provide efficient heat insulation to maintain the contents in the original heated, chilled or frozen condition for relatively long periods.

While the end wall 28 of the receptacle 10 is formed to completely close the related end of the receptacle, it may be desirable to provide a central aperture in the bottom end wall when the receptacle is employed as a cushioning shell for a liquor bottle or other similar glass container so that the code number or marking, usually applied to the bottom of the bottle, can be viewed without removing the bottle from its cushioning shell.

Thus, in the embodiment of the invention illustrated in Figs. 4 and 5, the receptacle 10a includes a bottom wall 28a in the form of an annular ring of corrugated paper or cardboard fitting into the lower end of the tubular side wall 12a. The slit end portions 22a of the outer layer 18a of the side wall are folded inwardly and adhesively secured to the lower surface of the wall 28a to close the lower ends of the passages 20 in the side wall, and then folded upwardly through the central opening of the end wall 28a and reverted radially outward, as seen in Fig. 5, for adhesive attachment to the upper surface of the wall 28a thereby also closing the internal passages of the latter and reinforcing the bottom end wall. Thus, the bottom of the receptacle 10a is provided with a central aperture 30 through which a code marking or indicia on the bottom of a bottle or other article received in the receptacle can be viewed.

While the embodiments of the invention illustrated in Figs. 1, 2 and 3 and in Figs. 4 and 5 have side walls formed with a single undulating layer therein which may be formed with undulations of any desired depth to provide a thicker or thinner side wall, it is to be understood that the side wall of the receptacle and the end walls of the latter can include a plurality of corrugated courses. For example, in the embodiment of Fig. 6, the receptacle 10b, of which a fragment is illustrated, is provided with a side wall 12b which includes an inner smooth layer 14b having a first undulating layer 16b adhesively secured to the outer surface of the latter, a smooth layer 32 adhesively secured to the outer peaks or crests of the undulating layer 16b and having a second undulating layer 34 adhesively secured to its outer surface, a smooth layer 36 adhesively secured to the outer peaks or crests of the layer 34 and having a third undulating layer 38 adhesively secured to the outer surface of the layer 36, and, finally, an outer smooth layer 18b adhesively secured to the outer peaks or crests of the outermost undulating layer 38. In forming the wall 12b, the layers 14b and 16b, the layers 32 and 34, and the layers 36 and 38 are separately adhesively secured together. Then the joined layers 14b and 16b are bent to the desired tubular configuration, the joined layers 32 and 34 are wrapped around and secured to the layer 16b, and the layers 36 and 38 are wrapped around and secured to the layer 34. Finally, the layer 18b is wrapped around and secured to the layer 38. Thus, the circumferential dimensions of the several layers will increase from the inner surface to the outer surface of the wall 12b.

As in the previously described embodiments, the outer layer 18b extends beyond the other layers of the wall 12b in the axial direction and the end portions 24b of the outer wall 18b are folded radially inward and adhesively secured to seal-off the ends of the internal channels or passages defined between the several undulating and smooth layers. Thus, the wall 12b has relatively great strength, by reason of the multiple corrugated construction and is endowed with increased cushioning capabilities as a result of the large number of sealed air containing passages included in the wall structure. While the embodiment illustrated in Fig. 6 has a side wall which includes three undulating layers 16b, 34 and 38, it is to be understood that the number of undulating layers may be increased or decreased as desired to vary the thickness, rigidity and insulating properties of the wall structure.

Further, while the embodiments of the invention illustrated in Figs. 1, 2 and 3 and Figs. 4 and 5 are formed with tubular sidewalls of circular cross-section, it is to be understood that the cross-sectional configuration of the side wall may be varied as desired, for example, the tubular side wall can be elliptical, polygonal or otherwise, although a side wall having curves or bends of relatively large radius is preferred. Specifically referring to Fig. 7, an embodiment 10c of the invention is there illustrated and includes a side wall 12c and a bottom wall 28c constructed and joined together in the manner hereinabove described in detail. The cross-sectional configuration of the tubular side wall 12c is substantially that of an elongated rectangle having semi-circular additions at the opposite ends, and the side wall 12c therefore includes flat, parallel sides 40 connected together at their opposite ends by semi-cylindrical wall portions 42. It is apparent that the folded over end portions of the outer smooth layer of the wall 12c, which act to seal-off the internal channels or passages within the side wall, are required to be slit, as at 26c, only in the semi-cylindrical wall portions 42.

As seen in Fig. 7, the receptacle 10c is adapted to receive a plurality of cylindrical cans 44, for example, beer cans, and the receptacle can be closed by a cover (not shown) of the kind hereinafter described in detail. When the receptacle 12c is closed it can be used as a heat insulating container, for example, for chilled cans of beer, and it then provides a convenient and compact insulated package for carrying beer or other canned beverages to picnics or other functions.

Referring now to Fig. 8, a suitable, removable cover for association with the previously described receptacles is there shown and generally identified by the reference numeral 46. The cover 46 includes a top 48 and a peripheral depending flange 50 which is formed to telescope over the side wall of the receptacle 10. The construction of the cover 46 can be similar to the construction of the hereinabove described receptacles, but inverted, with the top 48 corresponding to the bottom 28 of the receptacle and the flange 50 corresponding to the side wall 12. Thus, the top 48 of the cover is formed of a suitably shaped flat piece of corrugated paper or cardboard and the flange 50 is also formed of corrugated paper or cardboard and includes an inner smooth layer 52, an undulating layer 54 secured to the outer surface of the layer 52 and an outer smooth layer 56 secured to the outer peaks of the undulating layer 56. The layers 52, 54 and 56 define internal passages therebetween extending axially, and the outer layer 56 extends beyond the layers 52 and 54 in the direction of the internal passages. The upper end portions of the layer 56 are folded inwardly, as at 58, and adhesively secured to the upper surface of the top 48 to secure the flange 50 to the latter and to close the upper ends of the internal passages of the flange, and the lower end portions of the layer 56 are folded inwardly and then upwardly and adhesively secured to the inner surface of the layer 52, as at 60, to close the lower ends of the internal passages and to reinforce the lower edge of the flange 50.

From the foregoing, it is apparent that a cover 46, when mounted on one of the above described receptacles, is effective to seal the open end of the receptacle and completes the shock resistant and heat insulating envelope around the contents of the receptacle.

The closure or cover 46 described in connection with Fig. 8 is removable without destroying the associated receptacle so that the latter may be again closed or reused. However, in certain circumstances it may be desirable to provide a sealing closure for receptacles of the described character which is not replaceable and requires at least partial destruction of the receptacle structure to prevent reuse of the receptacle. Referring to Fig. 9 of the drawings, a receptacle 10d is there illustrated which includes a tubular side wall 12d of corrugated paper or cardboard and a bottom wall 28d of a flat piece of corrugated paper or cardboard joined to the side wall by the inwardly folded and adhesively secured end portions 22d of the outer layer of the side wall, in the manner previously described in detail.

The receptacle 10d is provided with a closure 62 in the form of a flat piece of corrugated paper or cardboard shaped to fit into the upper open end of the receptacle after the contents have been placed in the latter. The upper end portions 24d of the outer layer of the side wall 12d are not folded inwardly until after the receptacle has been filled and the closure 62 has been positioned in the open end. Then the upper end portions 24d are folded inwardly and adhesively secured to the upper surface of the closure 62 to hold the latter in place and seal the receptacle. With the closure of Fig. 9, it is apparent that the receptacle 10d can be opened only by tearing away or cutting through the folded end portions 24d to free the closure 62 so that the receptacle cannot be reused without giving evidence of that fact.

Referring now to Fig. 10 of the drawings, an embodiment of the invention is there illustrated, and generally identified by the reference numeral 10e, which in combination with a conventional glass bottle provides an insulated or vacuum bottle for containing heated or chilled liquids. The receptacle 10e includes a tubular side wall 12e joined to a bottom wall 28e by inwardly folded lower end portions 22e of the outer layer of the corrugated material of the wall 12e. A conventional glass bottle 64 is received in the receptacle 10e and is formed with a reduced discharge neck 66 which is closed by a removable cork or rubber stopper 68. The bottle 64 is preferably spaced from the side wall 12e and the bottom wall 28e by suitable spacing blocks 70 which may be formed of rubber, cork or any other cushioning material.

The bottle 64 is dimensioned so that the discharge neck 66 thereof projects upwardly out of the receptacle 10e and the latter is provided with an annular top wall 72, of corrugated paper or cardboard, through which the neck 66 extends. The annular top wall 72 is secured in place, after the bottle 64 is positioned in the receptacle, by folding inwardly the upper end portions 24e of the outer layer of the side wall 12e and adhesively securing the folded end portions 24e to the annular wall 72. Preferably, the end portions 24e are long enough so that they can extend around the inner edge of the annular wall 72 to seal the internal passages of the wall 72 as well as the upper ends of the internal passages in the side wall 12e. Further, resilient and insulating material 74, which may be glass wool and the like, is packed around at least the upper portion of the bottle 64 under the annular wall 72. Since the annular wall 72 engages closely around the neck 66 of the bottle, the wall 72 prevents removal of the bottle from the receptacle 10e.

A cover 46e, which is structurally similar to the cover 46 described in connection with Fig. 8 of the drawing, is provided to telescope over the upper portion of the receptacle 10e for enclosing the projecting neck 66 and stopper 68 of the bottle. A circumferential band 76 is preferably secured to the outer surface of the side wall 12e adjacent the top thereof to define a stop for limiting the downward movement of the cover. If desired a decorative outer layer 78, formed of a printed paper, fabric, leather or plastic material, may be superposed on the receptacle 10e and the cover 46e and layers of metal foil (not shown) may be provided on the inside surface of the receptacle and the outside surface of the bottle to enhance the heat insulating characteristics of the assembly.

It is apparent that the corrugated paper or cardboard construction of the receptacle 10e and the cover 46e provides sealed air spaces between the layers thereof for deterring heat transfer through the walls of the receptacle and also serves to cushion the bottle against severe shocks or impacts so that the bottle is not easily broken. Thus, heated or chilled liquids can be placed in the bottle 64 and maintained at substantially the original temperature for long periods of time, and the assembly can be subjected to rough handling without the danger of chipping off pieces of the glass bottle.

From the foregoing, it is apparent that the present invention provides receptacles of the described character having walls of corrugated paper or cardboard with sealed-off, internal, air containing passages to cushion and insulate the contents of the receptacles. Further, the receptacles embodying the present invention have the end walls thereof secured to the side walls by folded tabs or end portions of the outer layer forming the corrugated material of the side walls so that these folded end portions serve the dual purpose of sealing-off the internal air containing passages and of uniting the several parts of the receptacles.

Further, it is to be understood that the word "tubular," as employed herein, is intended to denote a hollow structure of any cross-sectional configuration, whether circular, elliptical, polygonal or otherwise.

While I have described and illustrated several precise embodiments of the invention, it is to be understood that the present invention is not limited to these precise embodiments and that varoius changes and modifications may be effected therein by one skilled in the art without departing from the scope or spirit of the invention as defined in the appended claims.

What I claim is:

1. A receptacle of the described character comprising a tubular side wall including an inner smooth layer, an outer smooth layer and at least one undulating layer adhesively secured between said inner and outer layers and defining internal axially extending passages between the latter, said outer layer extending beyond said inner and undulating layers in the axial direction, a bottom wall at one end of said tubular side wall, an annular top wall at the other end of said tubular side wall and defining a central opening, the end portions of said outer layer being folded inwardly across the ends of said passages and over said bottom and top walls and being adhesively secured to the latter to fix said bottom and top walls in the related ends of said tubular side wall and to seal-off the adjacent ends of said passages so that the air trapped in the sealed-off passages cushions and insulates the contents of the receptacle, a glass bottle in the space enclosed by said tubular side wall and having a neck portion projecting through said central opening of the top wall, and a top closure having a peripheral depending flange formed to telescope over the upper portion of said tubular side wall for enclosing said top wall of the receptacle and said projecting neck of the bottle.

2. A receptacle according to claim 1; wherein said bottom and top walls are formed of corrugated material having internal passages therein, and said end portions of the outer layer at said other end of the tubular side wall extend over and wrap around the inner edge of said top wall defining the central opening to seal-off said internal passages of the top wall.

3. A receptacle according to claim 2; wherein said top closure includes a top wall formed of corrugated material having internal passages therein and with said flange depending from the periphery of said top wall of the closure; and wherein said flange is formed of corrugated material including smooth inner and outer layers and at least one undulating layer adhesively secured therebetween and defining axial internal passages between said smooth layers of the flange, said smooth outer layer of the flange extending axially beyond the other layers of the flange and the end portions of said smooth outer layer of the flange being folded inwardly and adhesively secured to seal-off internal passages of the flange and to attach said flange to said top wall of the closure so that said bottle is enclosed by walls having sealed internal passages for cushioning and insulating the glass bottle.

References Cited in the file of this patent

UNITED STATES PATENTS

| | | |
|---|---|---|
| 961,885 | Myers | June 21, 1910 |
| 1,216,391 | Allen | Feb. 20, 1917 |
| 1,631,521 | Crowell | June 7, 1927 |
| 1,700,615 | O'Brien | Jan. 29, 1929 |
| 1,709,510 | White | Apr. 16, 1929 |
| 1,999,670 | Strouse et al. | Apr. 30, 1935 |
| 2,243,231 | Van Saun | May 27, 1941 |
| 2,246,426 | Wickstrom | June 17, 1941 |
| 2,276,374 | Derman | Mar. 17, 1942 |
| 2,458,737 | Salkowitz | Jan. 11, 1949 |
| 2,589,645 | Tiegel | Mar. 18, 1952 |
| 2,620,119 | George | Dec. 2, 1952 |

FOREIGN PATENTS

| | | |
|---|---|---|
| 12,235 | Great Britain | Apr. 20, 1895 |